(12) United States Patent
Lin

(10) Patent No.: US 11,531,458 B2
(45) Date of Patent: Dec. 20, 2022

(54) VIDEO ENHANCEMENT CONTROL METHOD, ELECTRONIC APPARATUS AND STORAGE MEDIUM

(71) Applicant: GUANGDONG OPPO MOBILE TELECOMMUNICATIONS CORP., LTD., Guangdong (CN)

(72) Inventor: Jinquan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/217,560

(22) Filed: Mar. 30, 2021

(65) Prior Publication Data
US 2021/0216199 A1 Jul. 15, 2021

Related U.S. Application Data

(63) Continuation of application No. PCT/CN2019/090439, filed on Jun. 6, 2019.

(30) Foreign Application Priority Data

Sep. 30, 2018 (CN) .......................... 201811162427.6

(51) Int. Cl.
*G06F 3/04847* (2022.01)
*G06F 3/0488* (2022.01)

(52) U.S. Cl.
CPC ........ *G06F 3/04847* (2013.01); *G06F 3/0488* (2013.01)

(58) Field of Classification Search
CPC .. G06F 3/04847; G06F 3/0488; G06F 1/1694; G06F 1/1626; G06F 1/1643;
(Continued)

(56) References Cited

U.S. PATENT DOCUMENTS

| 10,534,525 B1* | 1/2020 | Suchland | G06F 3/0481 |
| 2009/0089849 A1* | 4/2009 | Jefremov | H04N 21/4223 |
| | | | 725/118 |

(Continued)

FOREIGN PATENT DOCUMENTS

| CN | 102053867 A | 5/2011 |
| CN | 102480567 A | 5/2012 |

(Continued)

OTHER PUBLICATIONS

Gear| Definition of Gear by Merriam-Webster. (article) [online]. Merriam-Webster. Archived Jun. 12, 2018. Retrieved on Sep. 1, 2021. https://www.merriam-webster.com/dictionary/gear (Year: 2018).*

(Continued)

*Primary Examiner* — John T Repsher, III
(74) *Attorney, Agent, or Firm* — Young Basile Hanlon & MacFarlane, P.C.

(57) ABSTRACT

Described herein are a video enhancement control method, an electronic apparatus, and a storage medium. The method includes: detecting whether to enter a video enhancement configuration mode in response to displaying a video playback interface; displaying a sliding control on the video playback interface in response to being detected to enter the video enhancement configuration mode; acquiring a target video enhancement parameter in response to a sliding operation acting on the sliding control; and performing video enhancement of a video playback interface played on the video playback interface based on the target video enhancement parameter.

16 Claims, 13 Drawing Sheets

(58) Field of Classification Search
CPC ............... G06F 3/04817; G06F 3/0482; G06F 3/04842; G06F 3/04845; H04N 21/41407; H04N 21/4312; H04N 21/4402; H04N 21/440254; H04N 21/440263; H04N 21/485; H04N 21/4854; H04N 21/431
See application file for complete search history.

(56) References Cited

U.S. PATENT DOCUMENTS

| | | | | |
|---|---|---|---|---|
| 2010/0271549 | A1* | 10/2010 | Kuwabara | G03B 21/006 348/E5.1 |
| 2013/0173690 | A1* | 7/2013 | Gregg | H04N 21/2743 709/203 |
| 2013/0239057 | A1* | 9/2013 | Ubillos | G06F 3/04847 715/833 |
| 2014/0123041 | A1* | 5/2014 | Morse | G11B 27/105 715/765 |
| 2014/0169484 | A1* | 6/2014 | Jung | H04N 19/117 375/240.29 |
| 2014/0193140 | A1* | 7/2014 | Fliderman | G06F 3/04847 386/343 |
| 2014/0204244 | A1* | 7/2014 | Choi | H04N 5/232935 348/333.05 |
| 2014/0237365 | A1* | 8/2014 | Oberbrunner | H04N 21/437 715/722 |
| 2016/0162123 | A1 | 6/2016 | Kurita et al. | |
| 2017/0078358 | A1* | 3/2017 | Corley | H04N 21/233 |
| 2018/0020243 | A1 | 1/2018 | Ni et al. | |
| 2018/0261140 | A1 | 9/2018 | Yi et al. | |

FOREIGN PATENT DOCUMENTS

| | | |
|---|---|---|
| CN | 102811354 A | 12/2012 |
| CN | 103279276 A | 9/2013 |
| CN | 103500464 A | 1/2014 |
| CN | 104038620 A | 9/2014 |
| CN | 104247392 A | 12/2014 |
| CN | 104781127 A | 7/2015 |
| CN | 105138235 A | 12/2015 |
| CN | 105763922 A | 7/2016 |
| CN | 105791946 A | 7/2016 |
| CN | 105867796 A | 8/2016 |
| CN | 107230187 A | 10/2017 |
| CN | 107659828 A | 2/2018 |
| CN | 107741825 A | 2/2018 |
| CN | 109151573 A | 1/2019 |
| WO | 2013133895 A1 | 9/2013 |
| WO | 2018125590 A1 | 7/2018 |

OTHER PUBLICATIONS

Chinese First office action with English Translation of Chinese application No. 201811162427.6 dated Oct. 8, 2019 (20 pages).
Chinese second office action with English Translation of Chinese application No. 201811162427.6 dated Feb. 21, 2020 (15 pages).
Chinese third office action with English Translation of Chinese application No. 201811162427.6 dated Nov. 4, 2020 (21 pages).
International search report with English Translation of International application No. PCT/CN2019/090439 dated Aug. 27, 2019 (16 pages).
Rejection decision with English Translation of Chinese application No. 201811162427.6 dated May 8, 2020 (12 pages).
Extended European Search Report for EP Application 19866265.2 dated Aug. 30, 2021. (9 pages).

* cited by examiner

VIDEO ENHANCEMENT CONTROL METHOD, ELECTRONIC APPARATUS AND STORAGE MEDIUM

CROSS-REFERENCE TO RELATED APPLICATION(S)

The present application is a continuation-application of International (PCT) Patent Application No. PCT/CN2019/090439 filed Jun. 6, 2019, which claims priority of Chinese application No. 201811162427.6 filed on Sep. 30, 2018, the contents of both of which are hereby incorporated in their entireties by reference for all purposes.

TECHNICAL FIELD

The present disclosure relates to the technical field of image processing, and more particularly to a video enhancement control method and an electronic apparatus, and a storage medium.

BACKGROUND

With the development of society, electronic apparatuses with screens have an increasing range of applications. For example, it is conducive to screen displaying of images and videos. Displaying quality of most of the electronic apparatuses may be severely affected due to changes in surrounding light sources, or poor source quality of played videos.

SUMMARY

In view of the above problems, the present disclosure provides a video enhancement control method, an electronic apparatus and a storage medium to alleviate the above problems.

In an aspect, the present disclosure provides a video enhancement control method, applied to an electronic apparatus. The method includes: detecting whether to enter a video enhancement configuration mode in response to displaying a video playback interface; displaying a sliding control on the video playback interface in response to being detected to enter the video enhancement configuration mode; acquiring a target video enhancement parameter in response to a sliding operation acting on the sliding control; and performing video enhancement of a video played on the video playback interface based on the target video enhancement parameter.

In another aspect, the present disclosure provides an electronic apparatus including one or more processors and a memory; and one or more programs, wherein the one or more programs are stored in the memory; the one or more processors are configured to execute the one or more programs to implement following operation: detecting whether to enter a video enhancement configuration mode in response to displaying a video playback interface; displaying a sliding control on the video playback interface in response to being detected to enter the video enhancement configuration mode; acquiring a target video enhancement parameter in response to a sliding operation acting on the sliding control; and performing video enhancement of a video played on the video playback interface based on the target video enhancement parameter.

In yet another aspect, the present disclosure provides a computer-readable storage medium configured to store programs, wherein the programs, when executed by a processor, implement following operations: detecting whether to enter a video enhancement configuration mode in response to displaying a video playback interface; displaying a sliding control on the video playback interface in response to being detected to enter the video enhancement configuration mode; acquiring a target video enhancement parameter in response to a sliding operation acting on the sliding control; and performing video enhancement of a video played on the video playback interface based on the target video enhancement parameter.

BRIEF DESCRIPTION OF DRAWINGS

In order to more clearly explain technical solutions in embodiments of the present disclosure, drawings required to be used in the embodiment description will be briefly introduced below. Apparently, the drawings in the following description are only some of the embodiments of the present disclosure, and according to these drawings, other drawings may be further obtained by persons skilled in the art without expending inventive labor.

DETAILED DESCRIPTION

Figure 1:
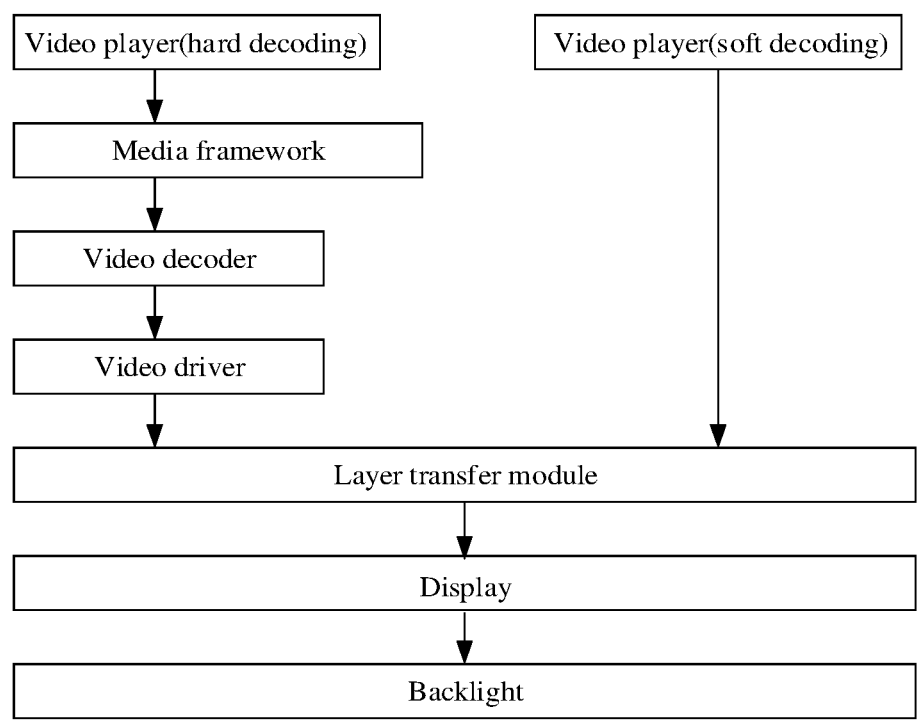
FIG. 1 shows a flowchart of a video decoding according to the present disclosure.

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. All other embodiments obtained by persons of ordinary skill in the art based on the embodiments of the present disclosure without expending inventive labor shall fall within the protection scope of the present disclosure.

With advancement of hardware performance of electronic apparatuses, an increasing number of electronic apparatuses may support video playback. For example, an electronic apparatus may have a video playback client run, and then have a video requested from the network played via the video playback client. Alternatively, it may have a web browser run and then have a video played in the web browser, or it may have a locally stored video file played via video playback software.

For either of the video transmitted and played over the internet and the locally stored video, when the video is generated, the generated video will be compressed to reduce its occupation of storage space to facilitate transmission over the Internet. Accordingly, the electronic apparatus, at the time of acquiring the video, may first acquire the compressed and encoded video. In this case, the electronic apparatus will first decode the compressed and encoded video.

According to an aspect of the present disclosure, a video enhancement control method, for an electronic apparatus, the method including: detecting whether to enter a video enhancement configuration mode in response to displaying a video playback interface; displaying a sliding control on the video playback interface, in response to being detected to enter the video enhancement configuration mode; acquiring a target video enhancement parameter in response to a sliding operation acting on the sliding control; performing video enhancement of a video played on the video playback interface based on the target video enhancement parameter.

In an embodiment, the sliding control includes a sliding component and a plurality of position identifiers, each of the position identifiers corresponding to a different video enhancement parameter, and the acquiring the target video enhancement parameter in response to the sliding operation acting on the sliding control includes: taking a first video enhancement parameter as the target video enhancement parameter, wherein the first video enhancement parameter corresponds to a position identifier at an ending position of the sliding operation in response to the sliding operation acting on the sliding component.

In an embodiment, the method further includes: acquiring a second video enhancement parameter, wherein the second video enhancement parameter corresponds to position identifiers passed by the sliding operation; and displaying video images in a suspending manner on the video playback interface, wherein the video images are enhanced based on the second video enhancement parameter according to the passed position identifiers.

In an embodiment, the method further includes: taking a video image for which a touch operation is detected among the video images displayed in the suspending manner, as a target video image; taking a video enhancement parameter corresponding to the target video image as the target video enhancement parameter.

In an embodiment, the sliding component includes a sliding bar and a sliding block slidable on the sliding bar, the plurality of position identifiers being sequentially arranged on the sliding bar; and wherein the taking a first video enhancement parameter, as the target video enhancement parameter, wherein the first video enhancement parameter corresponds to the position identifier at the ending position of the sliding operation in response to the sliding operation acting on the sliding component includes: moving the sliding block on the sliding bar in response to the sliding operation acting on the sliding block; acquiring a third video enhancement parameter, wherein the third video enhancement parameter corresponds to a position identifier where the sliding block being moved to; taking the third video enhancement parameter as the target video enhancement parameter.

In an embodiment, the position identifiers are configured to represent different gears of the sliding operation, the different gears corresponding to different video enhancement parameters, and wherein the taking the first video enhancement parameter as the target video enhancement parameter, wherein the first video enhancement parameter corresponds to the position identifier at the ending position of the sliding operation in response to the sliding operation acting on the sliding component includes: taking the first video enhancement parameter as the target video enhancement parameter, wherein the first video enhancement parameter corresponds to a gear where the ending position of the sliding operation lies in response to the sliding operation acting on the sliding component.

In an embodiment, the performing video enhancement of the video played on the video playback interface based on the target video enhancement parameter includes: performing video enhancement of the video played on the video playback interface from multiple dimensions based on the target video enhancement parameter corresponding to the position identifier, the multiple dimensions including definition, denoising degree, saturation, and contrast, different position identifiers representing different combinations of dimensions.

In an embodiment, the displaying the sliding control on the video playback interface in response to being detected to enter the video enhancement configuration mode includes: detecting a playback status of currently played video in response to being detected to enter the video enhancement configuration mode; determining displaying a manner of the sliding component and the position identifiers according to the playback status of the video played on the video playback interface; displaying a plurality of position identifiers along a parallel direction of a longer side of the video playback interface in response to the playback status being "pause" and displaying a plurality of the position identifiers along a parallel direction of a shorter side of the video playback interface in response to the playback status being "playing".

In an embodiment, the displaying the sliding control on the video playback interface in response to being detected to enter the video enhancement configuration mode includes: acquiring a display mode of currently played video in response to being detected to enter the video enhancement configuration mode; taking a parallel direction of a longer side displayed in a landscape mode as the parallel direction of the longer side of the video playback interface in response to the display mode being the landscape mode; taking a parallel direction of a shorter side displayed in a portrait mode as the parallel direction of the longer side of the video playback interface in response to the display mode being the portrait mode.

In an embodiment, the displaying the plurality of position identifiers along the parallel direction of the longer side of the video playback interface in response to the playback status being "pause" and displaying the plurality of position identifiers along the parallel direction of the shorter side of the video playback interface in response to the playback status being "playing" includes: displaying N position identifiers along the parallel direction of the longer side of the video playback interface in response to the playback status being "pause", wherein distance between the N position identifiers is a first spacing; displaying M position identifiers along the parallel direction of the shorter side of the video playback interface in response to the playback status being "playing", wherein distance between the M position identifiers is a second spacing, the first spacing being smaller than the second spacing, the N being greater than the M, a difference between video enhancement parameters corresponding to adjacent position identifiers being directly proportional to a value of a distance between the adjacent position identifiers.

In an embodiment, the sliding control includes a sliding member and a plurality of fixing members, each of the fixing members corresponding to a video enhancement parameter, and wherein the acquiring the target video enhancement parameter in response to the sliding operation acting on the sliding control includes: moving the sliding member in response to a touch operation acting on the sliding member; acquiring a target fixing member, the target fixing member being one of the plurality of fixing members overlapping with the moved sliding member; taking a video enhancement parameter corresponding to the target fixing member as the target video enhancement parameter.

In an embodiment, a controlling control is displayed in the video playback interface, and wherein the detecting whether to enter the video enhancement configuration mode in response to displaying the video playback interface includes: detecting whether the controlling control is in an on state, in response to displaying the video playback interface; determining to enter the video enhancement configuration mode in response to being detected that the controlling control is in the on state.

In an embodiment, the method further includes: monitoring picture quality of currently played video in real time, in response to detecting displaying of the video playback interface; and displaying prompt information of entering the video enhancement configuration mode in response to detecting that the picture quality does not meet preset conditions, and the prompt information is configured to enable video enhancement in the video enhancement configuration mode.

In an embodiment, the preset conditions include at least one of the following conditions: a resolution of the played video is higher than a set resolution, and the number of noises in the played video is less than a preset number, and color saturation of the played video is higher than a set saturation value.

In an embodiment, further including prior to the detecting whether to enter the video enhancement configuration mode in response to displaying the video playback interface: detecting whether there is currently a set video playback application running; determining the electronic apparatus to display the video playback interface, in response to the set video playback application running.

According to another aspect of the present disclosure, an electronic apparatus including: one or more processors, a video codec and a memory; one or more programs, wherein the one or more programs are stored in the memory; the one or more processors are configured to execute the one or more programs to implement following operations: detecting whether to enter a video enhancement configuration mode in response to displaying a video playback interface; displaying a sliding control on the video playback interface in response to being detected to enter the video enhancement configuration mode; acquiring a target video enhancement parameter in response to a sliding operation acting on the sliding control; performing video enhancement of a video played on the video playback interface based on the target video enhancement parameter.

In an embodiment, the one or more processors are further configured to execute the one or more programs to implement following operations: taking a first video enhancement parameter as the target video enhancement parameter, wherein the first video enhancement parameter corresponds to a position identifier at an ending position of the sliding operation in response to the sliding operation acting on the sliding component.

In an embodiment, the one or more processors are further configured to execute the one or more programs to implement following operations: detecting a playback status of currently played video in response to being detected to enter the video enhancement configuration mode; determining a displaying manner of the sliding component and the position identifiers according to the playback status of the video played on the video playback interface; displaying a plurality of position identifiers along a parallel direction of a longer side of the video playback interface in response to the playback status being "pause" and displaying a plurality of the position identifiers along a parallel direction of a shorter side of the video playback interface in response to the playback status being "playing".

In an embodiment, the one or more processors are further configured to execute the one or more programs to implement following operations: displaying N position identifiers along the parallel direction of the longer side of the video playback interface in response to the playback status being "pause", wherein distance between the N position identifiers is a first spacing; displaying M position identifiers along the parallel direction of the shorter side of the video playback interface in response to the playback status being "playing", wherein distance between the M position identifiers is a second spacing, the first spacing being smaller than the second spacing, the N being greater than the M, a difference between video enhancement parameters corresponding to adjacent position identifiers being directly proportional to a value of a distance between the adjacent position identifiers.

According to still another aspect of the present disclosure, a computer-readable storage medium configured to store programs, wherein the programs, when executed by a processor, implement following operations: detecting whether to enter a video enhancement configuration mode in response to displaying a video playback interface; displaying a sliding control on the video playback interface in response to being detected to enter the video enhancement configuration mode; acquiring a target video enhancement parameter in response to a sliding operation acting on the sliding control; performing video enhancement of a video played on the video playback interface based on the target video enhancement parameter.

Generally, as shown in FIG. 1, an electronic apparatus may perform video decoding in two ways, namely, hard decoding and soft decoding. Therein, hard decoding refers to decoding by use of non-CPU, such as GPU (Graphics Processing Unit), dedicated DSP, FPGA, ASIC chip, and the like. Soft decoding refers to decoding by use of CPU.

Specifically, as shown in FIG. 1, Media Framework acquires a video file to be played through an API interface with a client or a web browser, and delivers it to Video Decode. Therein, Media Framework is a multimedia framework in an operating system.

Regardless of hard decoding and soft decoding, in response to video data being decoded, the decoded video data will be sent to Surface Flinger (a layer transfer module), and in response to being rendered and synthesized by Surface Flinger, will be displayed on a screen. Therein, Surface Flinger, as an independent Service, receives all Surfaces as input, calculates a position of each Surface in the finally synthesized image according to parameters such as ZOrder, transparency, size, and position, and then delivers the positions to HWComposer or OpenGL to generate a final display Buffer before being displayed on a particular display apparatus.

The Inventor has discovered that, a visual enhancement process may be added to either of the hard decoding and the soft decoding, so that a subsequently played video has a better visual effect. For example, it is possible to perform edge denoising of a video, to adjust the exposure, or to enhance the definition based on HQV (hollywood quality video) technology. In addition, it is further possible to improve visual experience of the played video in other ways to achieve an ultra-clear visual effect, for example, to enhance the definition and color brightness degree of the video.

However, the Inventor has further discovered that, in response to whether an improvement should be made on a manner of controlling visual enhancement of a played video, a video enhancement control method and device, an electronic apparatus, and a storage medium that can improve control convenience and intelligence, as provided by the present disclosure, are proposed.

Contents of the present disclosure will be introduced below in conjunction with specific embodiments.

Figure 2:
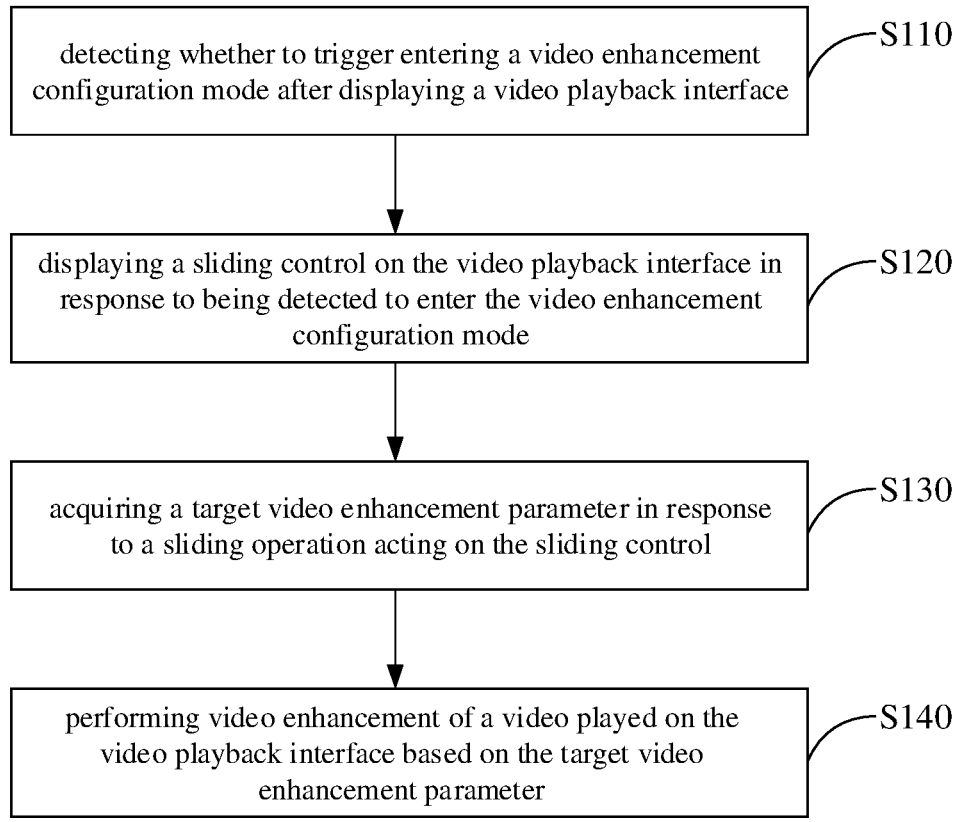
FIG. 2 shows a flowchart of a video enhancement control method according to the present disclosure.

With reference to FIG. 2, a video enhancement control method provided by the present disclosure, which is applied to an electronic apparatus, includes operations described in the following blocks.

At block S110, in response to a video playback interface being displayed, it may be detected whether to enter a video enhancement configuration mode.

In the present disclosure, the electronic apparatus may identify whether a video playback interface is currently displayed in multiple ways.

In an embodiment, it is detected whether a set video playback application is currently running in the foreground of the electronic apparatus, and in response to the set video playback application running, it is determined that the electronic apparatus displays a video playback interface. In an embodiment, if Android operating system is installed on the electronic apparatus, the name of the application currently running in the foreground may be acquired by executing the getRunningTasks method of ActivityManager. In addition, the electronic apparatus may also acquire a list of applications used by the user via UsageStatsManager, and identify the most recently used application recorded in the list as the current foreground application. Furthermore, it is further possible to monitor a change in window focus through Android's own barrier-free function, and to get a package name corresponding to the focus window as an application currently running in the foreground.

The electronic apparatus may pre-establish a list of video playback applications, so as to record video playback applications in the list. Therein, the list may be freely configured by the user of the electronic apparatus, or may be determined according to usage circumstances of a certain video playback application.

Furthermore, there is a set name for each interface of any of the applications. With the Android system as an example, if the operating system of the electronic apparatus is the Android system, the interface of the application is usually activity. Moreover, a data structure of the activity is a stack. Accordingly, in this case, the electronic apparatus may detect whether the activity stored on the top of the stack is a set activity, and in response to the activity stored on the top of the stack being a set activity, it is determined that the electronic apparatus displays the video playback interface. Likewise, the set activities may also be implemented in the form of a list.

In an embodiment, after an application is detected to be installed or updated, the electronic apparatus may start to detect whether the installed or updated application includes an activity of a video playback control, and in response to the installed or updated application including an activity of a video playback control, takes the included activity of the video playback control as a set activity. Of course, it may be understood that, in order to avoid misidentification of the electronic apparatus in the case that different applications have activities with a same name, the electronic apparatus, in an embodiment, may calculate feature values of contents included in the activities, and then take the feature values as part of the names when the activities are stored, so as to avoid misidentification of the electronic apparatus in the case that different applications have activities with a same name. Therein, the feature values may be calculated through hash algorithm.

For example, if the electronic apparatus has detected that an installed application A has an activity named video, and has also detected that an application B also has an activity named video, the electronic apparatus, in this case, may carry out hash calculation of the content of the activity named video included in the application A to obtain a first feature value, and then carry out hash calculation of the content of the activity named video included in the application B to obtain a second feature value. Subsequently, when the activity named video in the application A is stored, the storage name is "first feature value/video", and when the activity named video in the application B is stored, the storage name is "second feature value/video".

Figure 3:
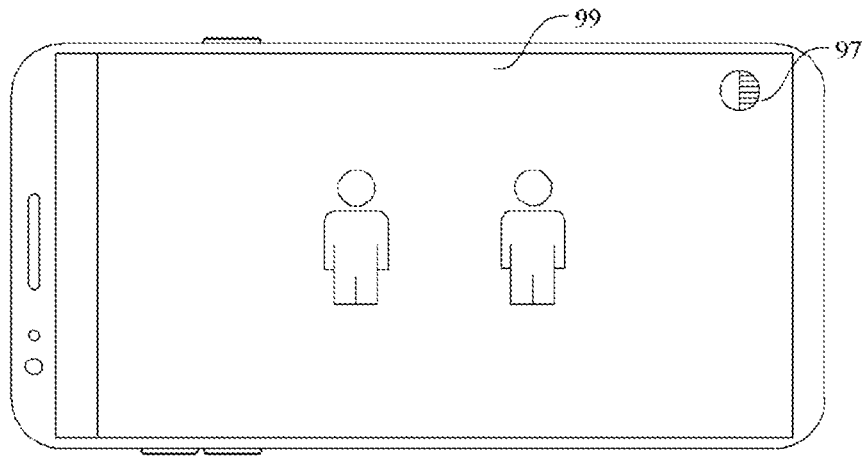
FIG. 3 shows a schematic diagram of a controlling control in a video enhancement control method according to the present disclosure.

In the video enhancement configuration mode, the user may configure whether the electronic apparatus performs video enhancement of the video currently played on the video playback interface. For example, as shown in FIG. 3, a controlling control 97 may be displayed in a video playback interface 99 shown in FIG. 3. Alternatively, in response to the electronic apparatus detects that the video playback interface 99 being displayed, the controlling control 97 is displayed on the video playback interface 99. Accordingly, in this case, in response to the electronic apparatus detecting that the controlling control 97 is in an on state, the electronic apparatus may determine to enter the video enhancement configuration mode. When the electronic apparatus detects that the controlling control 97 is in an off state, the electronic apparatus determines that the video enhancement configuration mode is not entered. It may be understood that, as for the two states of being in the on state and the off state, the controlling control 97 may allow for a change in color, shape, or display area to facilitate the user's differentiation.

Furthermore, in addition to enter or exiting the video enhancement configuration mode via the controlling control displayed on the video playback interface, it is further possible to enter the video enhancement configuration mode in other ways.

For example, in response to the electronic apparatus detects that the video playback interface being displayed, it is possible to monitor picture quality of the currently played video in real time. After it has been detected that the picture quality does not meet set conditions, prompt information of entering the video enhancement configuration mode is displayed, so that the user may enable video enhancement in the video enhancement configuration mode.

Figure 4:
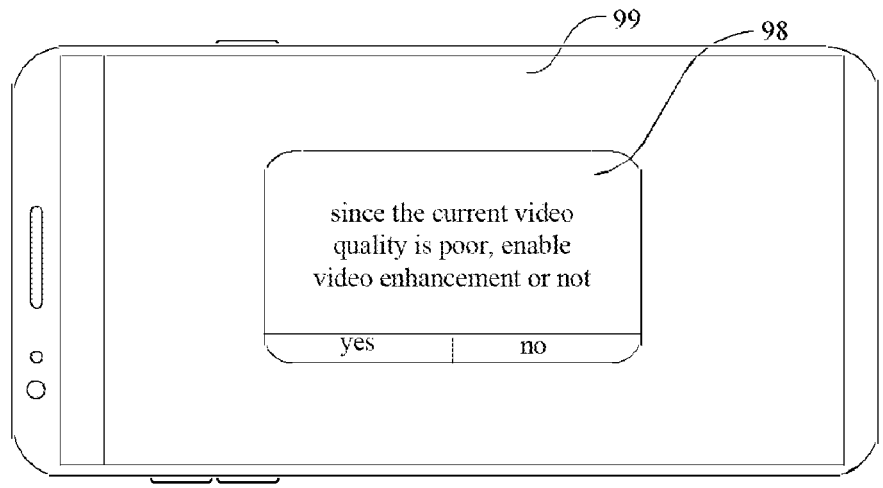
FIG. 4 shows a schematic diagram of a kind of prompt information in a video enhancement control method according to the present disclosure.

For example, as shown in FIG. 4, a pop-up box 98 is displayed on the video playback interface 99 in a suspending manner, and prompt information "since the current video quality is poor, enable video enhancement or not" is displayed in the pop-up box 98. In the pop-up box, a button "yes" and a button "no" are displayed. In response to being detected that the user has touched the button "yes", the electronic apparatus enters the video enhancement configuration mode, and in response to being detected that the user has touched the button "no", the pop-up box 98 is hidden.

In an embodiment, alternatively, the set conditions include at least one of the following conditions: a resolution of the played video is higher than a set resolution; the number of noises in the played video is less than a set number; and color saturation of the played video is higher than a set saturation value.

It should be noted that, the electronic apparatus may acquire a resolution of a current video in multiple ways.

Alternatively, the electronic apparatus may extract a frame of target image from the played video as a basis for attribute judgment. It may be understood that, if an image is already blurred, then it is subjected to further blurring treatment, and high-frequency component in the image will not change much. However, if the definition of the image itself is rather high, and the image is subjected to one-time blurring treatment, the high-frequency component will change largely. In an embodiment, the electronic apparatus may perform blurring treatment of the target image (for example, Gaussian blurring treatment) to obtain a degraded image of the image, and then a comparison is made between changing circumstances of adjacent pixel values of the image before the blurring treatment and the image after the blurring treatment. According to a value of the change, the level of the definition value is determined, and then the determined definition is used as the resolution. Accordingly, in this case, the greater the change, the higher the definition of the target image, and the higher the resolution.

Furthermore, in addition to the above-mentioned blurring treatment of the target image to determine the definition of the target image, it is further possible to adopt other methods to calculate the definition. Alternatively, it is possible to determine the definition through the following calculation formula $D(f)=\Sigma_y\Sigma_x|f(x+2,y)-f(x,y)|^2$. Therein, f (x, y) represents gray values of corresponding pixels (x, y) of an image f, and D(f) is a calculated result of the image definition, which result is then used as the resolution. Alternatively, in the present disclosure, f (x, y) can select a high-frequency component area in a real-time preview image.

Alternatively, if the currently played video provides multiple resolutions for selections by the user, then a resolution of the current video can be obtained by reading a resolution selected by the user for video playback.

Furthermore, it can be understood that, if there are noises in the image, the noises may possibly exist in an edge area (high-frequency component area) of the image or areas other than the edge of the image. However, since the noises along the edge are not visually obvious, the mobile terminal may detect only the noises other than those of the edge so as to shorten evaluation time, in an embodiment. Edge detection may be affected by the noise. Therefore, the mobile terminal may perform pre-treatment of noise filtering, prior to detecting the edge. Alternatively, the mobile terminal may adopt mean filtering to eliminate a part of the noises, and the image g(x, y) after the mean filtering is:

$$g(x, y) = \frac{1}{3 \times 3}\left[\sum_{i=-1}^{1}\sum_{j=-1}^{1} f(x+i, y+j)\right].$$

Then corresponding candidate noises are:

$$D_h(x, y) = |g(x, y+1) - g(x, y-1)|,$$

$$D_{h-mean} = \frac{1}{M \times N}\sum_{x=1}^{M}\sum_{y=1}^{N} D_h(x, y).$$

Likewise, corresponding values can be calculated in a vertical direction. Then the candidate noises obtained are:

$$N_{cand}(x, y) = \begin{cases} \max(D_v(x, y), \max(D_h(x, y)) & \text{if } D_h(x, y) < D_{h-mean} \text{ and} \\ & D_v(x, y) < D_{v-mean} \\ 0 & \text{otherwise} \end{cases}.$$

Ncand (x, y) represents detected noises. Upon calculation, the number of noises in the real-time preview image can be obtained.

Secondly, the electronic apparatus may acquire saturation of each frame of image in the video based on an existing method of acquiring image saturation.

It should be noted that, which conditions the preset conditions specifically include may be adapted to actual application scenarios.

In an embodiment, it is possible to determine which conditions the preset conditions specifically include according to current processing resources and quantity of electricity of the electronic apparatus. It may be understood that, in the case that the video enhancement is already enabled, the electronic apparatus will consume more processing resources (for example, CPU's computing resources or GPU's processing resources) and quantity of electricity. Accordingly, in the case that the electronic apparatus detects that processing resources of the electronic apparatus are relatively limited (for example, a CPU or GPU occupancy rate exceeds a set value) and/or the quantity of electricity is smaller than a set value, the electronic apparatus may make the preset conditions concurrently include the following: the resolution of the played video is higher than the set resolution; the number of noises in the played video is less than the set number; and the color saturation of the played video is higher than the set saturation value, thereby raising a threshold for reminding the user to perform video enhancement and being also conducive to the long battery life of the electronic apparatus.

In another embodiment, if it is detected that the current video is played at a resolution manually selected by the user, and in the case that the resolution manually selected by the user is not the highest resolution that can be supported by the video, it means that the current user has no higher requirement for the resolution. Accordingly, the electronic apparatus may configure preset conditions to include the following: the color saturation of the played video is higher than the set saturation value.

At block S120, in response to being detected that the video enhancement configuration mode is entered, a sliding control may be displayed on the video playback interface.

At block S130, a target video enhancement parameter may be acquired in response to a sliding operation on the sliding control.

At block S140, video enhancement of a video played on the video playback interface may be performed based on the target video enhancement parameter.

A video enhancement control method provided by the present disclosure detects whether a video enhancement configuration mode is entered in response to a video playback interface being displayed, displays a sliding control on the video playback interface if the video enhancement configuration mode is entered, then acquires a target video enhancement parameter in response to a sliding operation acting on the sliding control, and performs video enhancement of a video played on the video playback interface based on the target video enhancement parameter, such that the user may adjust a video enhancement effect of the currently played video based on displaying of a sliding component displayed on the video playback interface, thereby improving the user experience.

Figure 5:
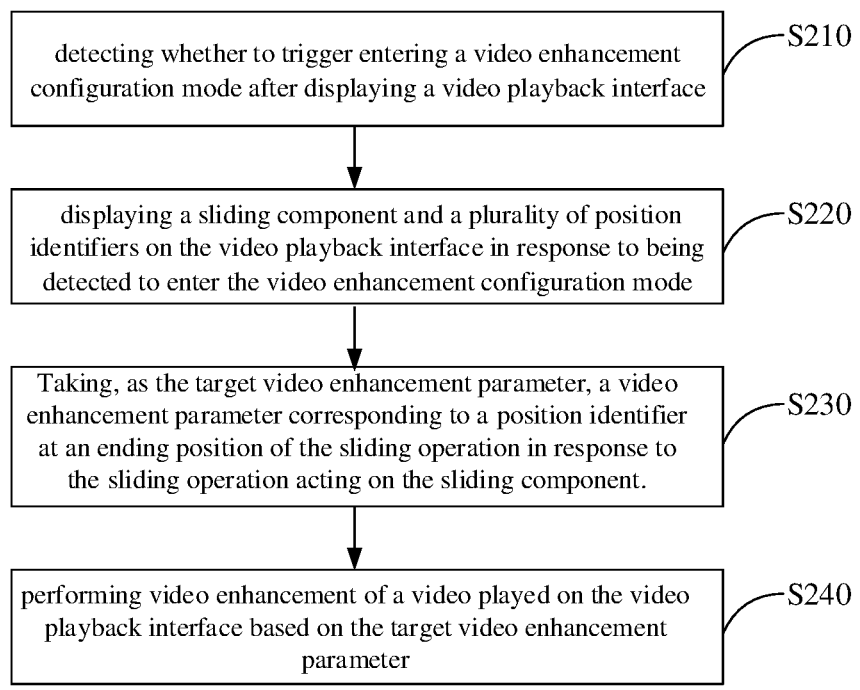
FIG. 5 shows a flowchart of another video enhancement control method according to the present disclosure.

With reference to FIG. 5, a video enhancement control method provided by the present disclosure, which is applied to an electronic apparatus, includes operations described in the following blocks.

At block S210: detecting whether to enter a video enhancement configuration mode in response to displaying a video playback interface;

At block S220: displaying a sliding component and a plurality of position identifiers on the video playback interface, in response to being detected to enter the video enhancement configuration mode.

It may be understood that, in the present disclosure, the user may select a desired video enhancement effect by sliding a sliding control. In response to the electronic apparatus detecting ending of an operation of sliding the sliding control, a target video enhancement parameter may be determined, and then based on the target video enhancement parameter, video enhancement of a video played on the video playback interface is performed. In an embodiment, the sliding control includes a sliding component and a plurality of position identifiers, where each of the position identifiers corresponds to a different video enhancement parameter. Therein, the position identifiers are configured to represent different gears of the sliding operation. It may be understood that, different gears correspond to different video enhancement parameters, i.e., gears of video enhancement parameters corresponding to different position identifiers are different.

It should be noted that, in the process of the video enhancement, it is possible to perform enhancement of the played video from multiple dimensions. For example, it is possible to perform enhancement from the dimensions of definition, denoising degree, saturation, and contrast. Accordingly, in an embodiment, different position identifiers represent different combinations of dimensions. In another embodiment, different position identifiers are continuous enhancement of a certain dimension or several dimensions. The meaning specifically represented by each position identifier will be described below in conjunction with specific examples of the position identifiers.

In an embodiment, in response to being detected to enter the video enhancement configuration mode, the electronic apparatus may determine a manner of displaying the sliding component and the position identifiers according to a playback status of the video played on the video playback interface.

In this case, the electronic apparatus can detect the playback status of the currently played video. If the playback status is "pause", a plurality of position identifiers are sequentially displayed along a parallel direction of a longer side of the video playback interface, and if the playback status is "playing", a plurality of position identifiers are sequentially displayed along a parallel direction of a shorter side of the video playback interface.

Figure 6:
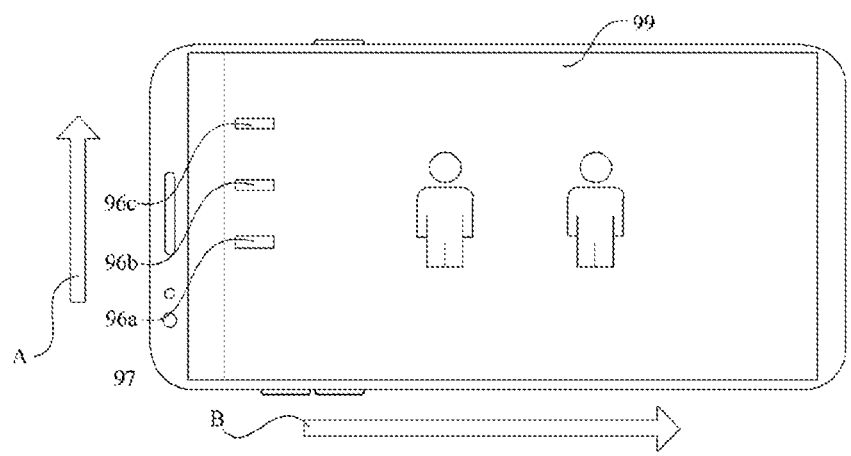
FIG. 6 shows a schematic diagram of a position identifier displaying direction in a video enhancement control method according to the present disclosure.

It may be understood that, if the video is in the status "playing" and a larger area is still occupied on the video playback interface to display the sliding component and the position identifiers, it is likely to affect the user's viewing of the video. Accordingly, in this case, as shown in the foregoing contents, a plurality of position identifiers may be displayed along the parallel direction of the shorter side of the video playback interface. For example, as shown in FIG. 6, in a landscape mode, the direction indicated by arrow A is the parallel direction of the shorter side of the video playback interface, and the direction indicated by arrow B is the parallel direction of the longer side of the video playback interface. In this case, when the electronic apparatus detects that the video is being played, position identifiers 96a, 96b, and 96c can be displayed in the direction indicated by arrow A. When the electronic apparatus detects that the video is paused, the position identifiers 96a, 96b, and 96c can be displayed along the direction indicated by the arrow B, as shown in FIG. 7.

Therefore, in this case, based on the definition of the dimensions included in the video enhancement parameters in the foregoing contents, in an embodiment, the position identifiers 96a, 96b, and 96c may respectively correspond to different combinations of dimensions. For example, where the video enhancement parameters include definition, denoising degree, and saturation, the position identifier 96a may correspond to definition a1, denoising degree a2, and saturation a3; the position identifier 96b may correspond to definition b1, denoising degree b2, and saturation b3; and the position identifier 96c may correspond to definition c1, denoising degree c.2, and saturation c3. In this manner, a certain dimension of the video enhancement parameters corresponding to the plurality of position identifiers does not have an obvious sequential enhancement or reduction relationship. In this case, different position identifiers may further correspond to different enhancement modes. For example, the video enhancement parameter corresponding to the position identifier 96a is visual enhancement of foreground objects; the video enhancement parameter corresponding to the position identifier 96b is visual enhancement of background objects; and the video enhancement parameter corresponding to the position identifier 96c is visual enhancement of both the foreground objects and the background objects.

In another embodiment, the plurality of position identifiers may be continuous enhancement corresponding to a certain dimension or multiple dimensions. For example, in the case that the video enhancement parameters include definition, denoising degree, and saturation, the corresponding definition, denoising degree, and saturation of each of the position identifiers 96a, 96b, and 96c are sequentially enhanced.

Figure 7:
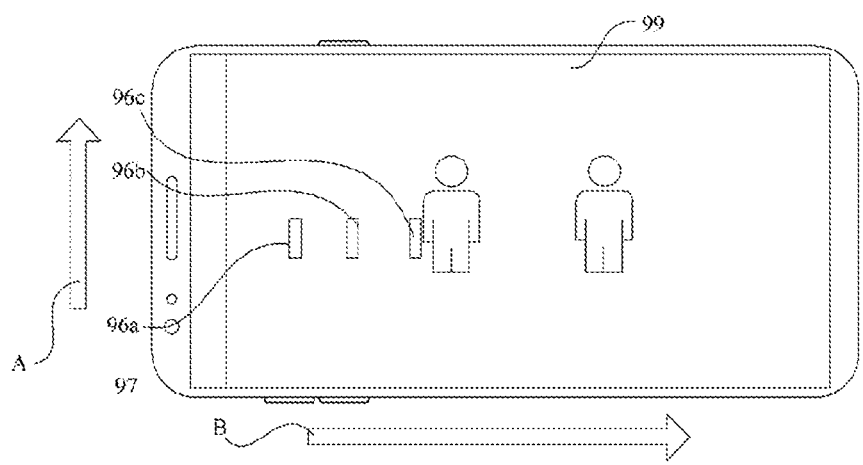
FIG. 7 shows a schematic diagram of another position identifier displaying direction in a video enhancement control method according to the present disclosure.
Figure 8:
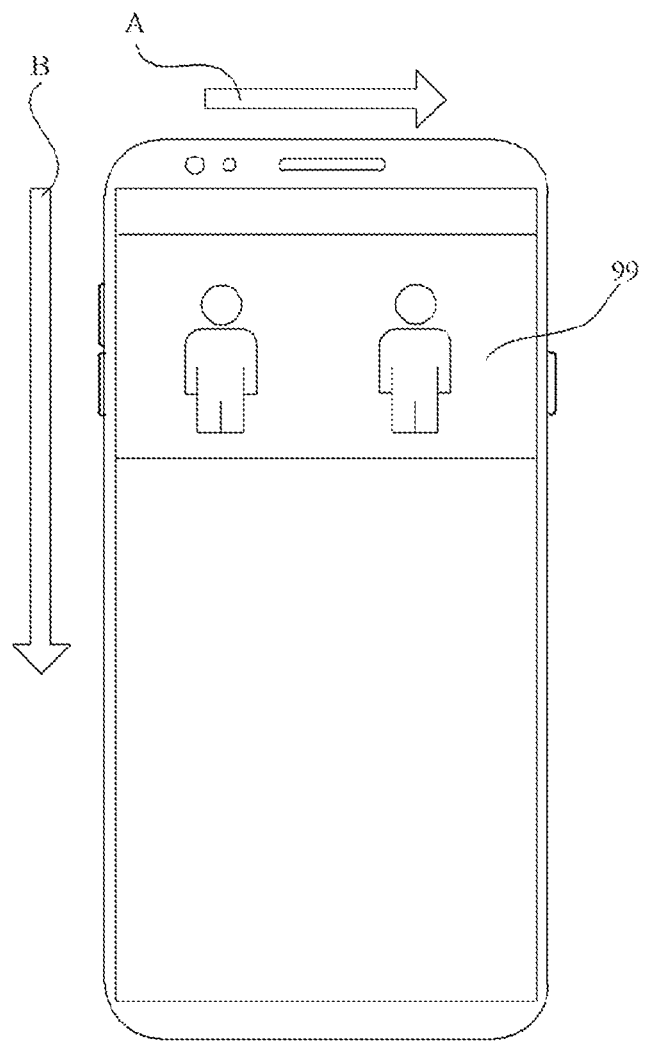
FIG. 8 shows a schematic diagram of yet another position identifier displaying direction in a video enhancement control method according to the present disclosure.

It should be noted that, FIG. 6 and FIG. 7 show manners of displaying an electronic apparatus in a landscape mode. When the electronic apparatus is in a portrait mode, a parallel direction of a longer side of a video playback interface and a parallel direction of a shorter side of the video playback interface, as determined by the electronic apparatus, may differ somewhat. For example, as shown in FIG. 8, in portrait mode, the direction indicated by arrow A is the parallel direction of the longer side of the video playback interface, as determined by the electronic apparatus, and the direction indicated by arrow B is the parallel direction of the shorter side of the video playback interface, as determined by the electronic apparatus.

It should be noted that, in an embodiment, if the playback status is "pause", a plurality of position identifiers whose number is N are sequentially displayed along the parallel direction of the longer side of the video playback interface, where a distance between the N position identifiers is a first spacing; and if the playback status is "playing", a plurality of position identifiers whose number is M are sequentially displayed along the parallel direction of the shorter side of the video playback interface, where a distance between the M position identifiers is a second spacing. Therein, the first spacing is smaller than the second spacing; the N is greater than the M; and a difference between the video enhancement parameters corresponding to adjacent position identifiers is directly proportional to a value of a distance between the adjacent position identifiers.

It should be noted that, the preceding contents explain the arrangement of the plurality of position identifiers and the position relationship, and how the user selects different position identifiers will be described below in further conjunction with the specific structure of the sliding control.

Figure 9:
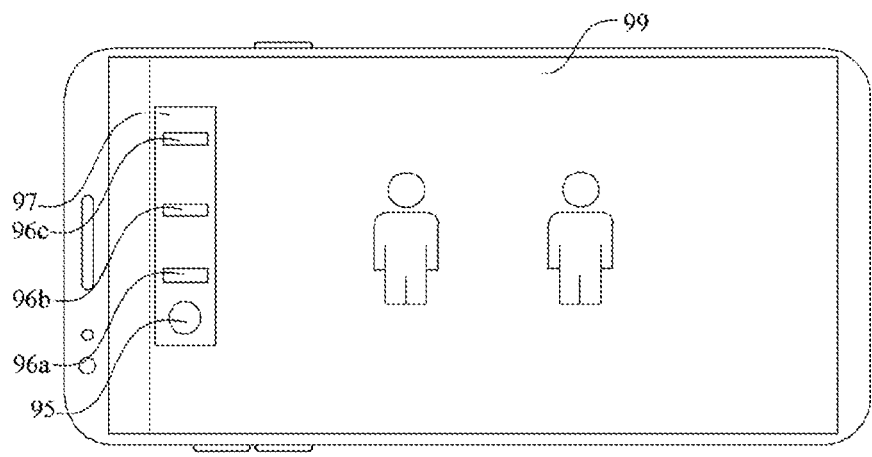
FIG. 9 shows a schematic diagram of a structure of a sliding control in a video enhancement control method according to the present disclosure.

In an embodiment, as shown in FIG. 9, the sliding component includes a sliding bar 97 and a sliding block 95 slidable on the sliding bar, and the plurality of position identifiers are sequentially arranged on the sliding bar 97.

Figure 10:
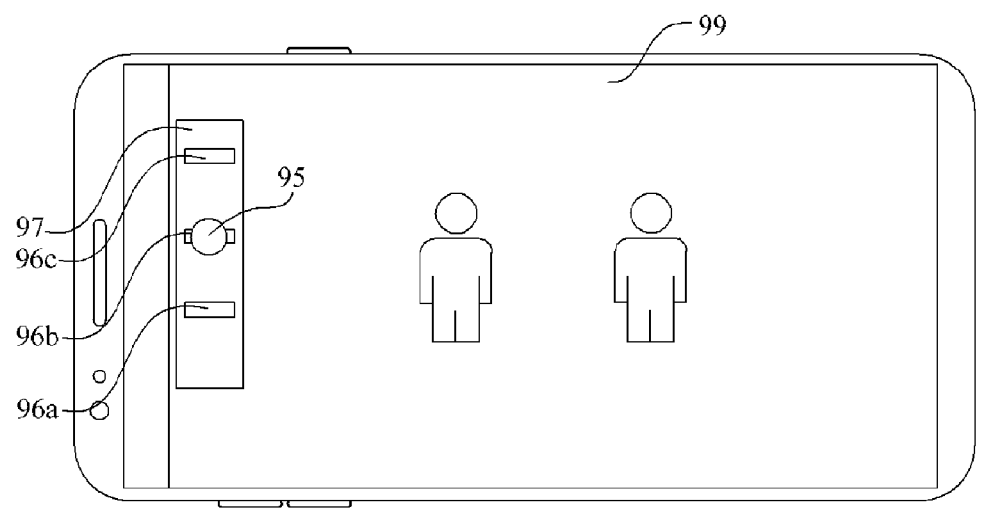
FIG. 10 shows a schematic diagram of movement of a sliding block in a video enhancement control method according to the present disclosure.

In this case, the operation of taking, as the target video enhancement parameter, a video enhancement parameter corresponding to a position identifier at an ending position of the sliding operation in response to the sliding operation acting on the sliding component includes: moving the sliding block on the sliding bar in response to the sliding operation acting on the sliding block; acquiring a third video enhancement parameter, wherein the third video enhancement parameter corresponds to a position identifier where the sliding block in response to being moved to; and taking the third video enhancement parameter as the target video enhancement parameter. For example, as shown in FIG. 10, when the sliding block 95 is moved to the position of the position identifier 96b, the electronic apparatus will take the video enhancement parameter corresponding to the position identifier 96b as the target video enhancement parameter.

At block S230, a video enhancement parameter corresponding to a position identifier at an ending position of the sliding operation may be taken as the target video enhancement parameter in response to the sliding operation acting on the sliding component.

At block S240, video enhancement of the video played on the video playback interface may be performed based on the target video enhancement parameter.

It should be noted that, when the user uses the sliding control to adjust the video enhancement mode for the first time, or the user is not familiar with the adjustment method, the user may possibly slide the sliding block rather randomly. For example, as for the form of the sliding block as shown in FIG. 9 or FIG. 10, the user may directly slide the sliding block from the initial position to the position where the position identifier 96c lies, causing the user to miss the visual enhancement effect resulting from the video enhancement parameters corresponding to the position identifier 96b and the position identifier 96a. Furthermore, the user may slowly slide the sliding block to test visual enhancement effects brought by video enhancement parameters corresponding to the respective position identifiers, but it is impossible to compare the video enhancement effects brought by the video enhancement parameters corresponding to the plurality of position identifiers quite intuitively at the same time.

Figure 11:
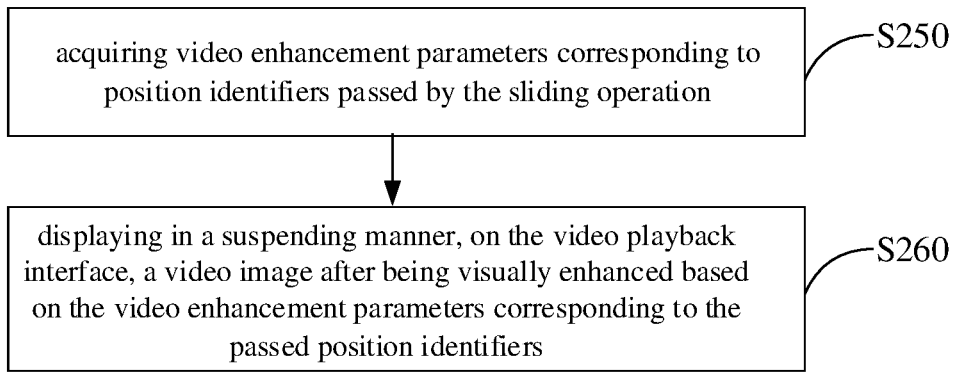
FIG. 11 shows a flowchart of displaying a suspending video image in another video enhancement control method according to the present disclosure.

In order to alleviate the foregoing problem, in an embodiment as shown in FIG. 11, the method further includes operations described in the following blocks.

At block S250: acquiring a second video enhancement parameter, wherein the second video enhancement parameter corresponds to position identifiers passed by the sliding operation;

At block S260: displaying video images in a suspending manner on the video playback interface, wherein the video image are enhanced based on the second video enhancement parameter according to the passed position identifiers.

Figure 12:
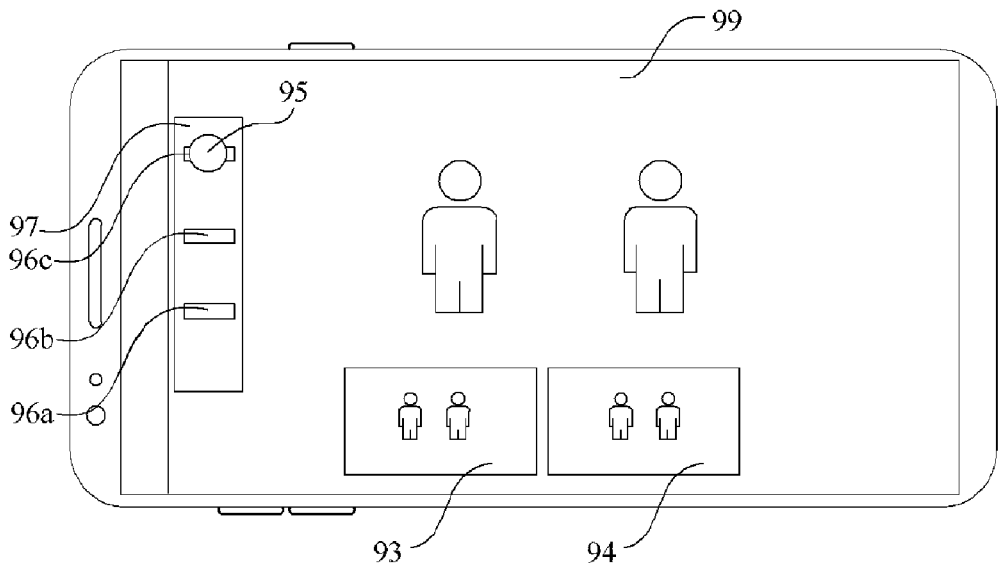
FIG. 12 shows a schematic diagram of a video image displayed in a suspending manner in a video enhancement control method according to the present disclosure.

As shown in FIG. 12, if the electronic apparatus detects that the sliding block 95 is directly slid to the position of the position identifier 96c, and does not stay at the passed position identifiers, that is, does not stay at the position identifier 96a and the position identifier 96b, the electronic apparatus may display in a suspending manner, on the video playback interface, video images, such as a video image 94 and a video image 93 as shown in FIG. 12, in response to being visually enhanced based on the video enhancement parameters corresponding to the passed position identifiers.

The video image 93 is a video image obtained by performing video enhancement of the played original video (that is, the video without video enhancement) based on the video enhancement parameter corresponding to the position identifier 96a. The video image 94 is a video image obtained by performing video enhancement of the played original video (that is, the video without video enhancement) based on the video enhancement parameter corresponding to the position identifier 96b. As such, the user may simultaneously compare video enhancement effects brought by the video enhancement parameters corresponding to the plurality of position identifiers.

Figure 13:
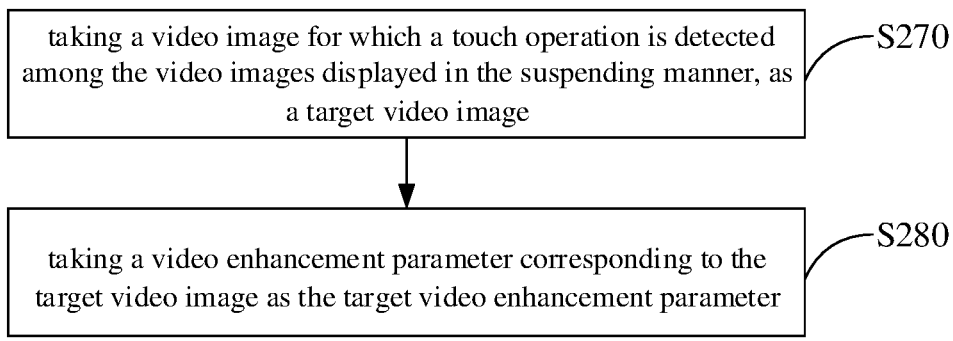
FIG. 13 shows a flowchart of determining a target video enhancement parameter in another video enhancement control method according to the present disclosure.

In another embodiment of determining the target video enhancement parameter, as shown in FIG. 13, the method further includes operations described in the following blocks.

At block S270: taking a video image for which a touch operation is detected among the video images displayed in the suspending manner, as a target video image;

At block S280: taking a video enhancement parameter corresponding to the target video image as the target video enhancement parameter, so as to facilitate the user in rapidly selecting a desired video enhancement effect.

Figure 14:
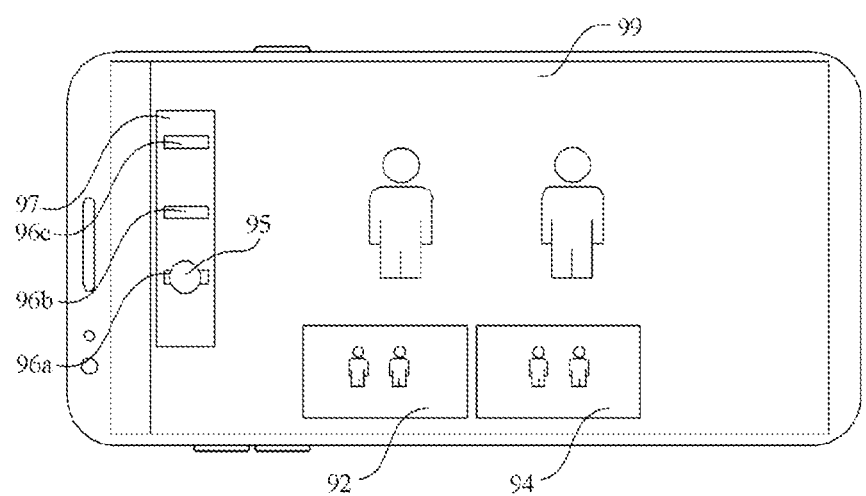
FIG. 14 shows a schematic diagram of video enhancement effect switching in another video enhancement control method according to the present disclosure.

It should be noted that, when the user determines the target video enhancement parameter by touching the suspending video image, the electronic apparatus will automatically move the sliding block to a position identifier corresponding to a corresponding video parameter of the aforementioned target video image (that is, a video image selected by the user), so that the user can perceive which position identifier the currently selected video image corresponds to. For example, as shown in FIG. 14, if the user selects the video image 93 shown in FIG. 12, the electronic apparatus will move the sliding block 95 to the position of the position identifier 96a, and switch the video played on the video playback interface 99 to achieve the video enhancement effect in the aforementioned video image 93, before switching the video played in the original video playback interface 99 to the video image 92 displayed in the suspending manner, so that the user can switch among multiple video enhancement effects.

The video enhancement control method provided by the present disclosure enables the user to adjust the video enhancement effect of the currently played video based on displaying of the sliding component displayed on the video playback interface, which improves the user's experience. Furthermore, while the determined target video enhancement parameter is used to perform visual enhancement of the video played on the video playback interface, it is also possible to display the video enhancement effects of the video enhancement parameters corresponding to the position identifiers passed by the sliding operation, so that the user can compare the multiple video enhancement effects to facilitate the user's selection.

Figure 15:
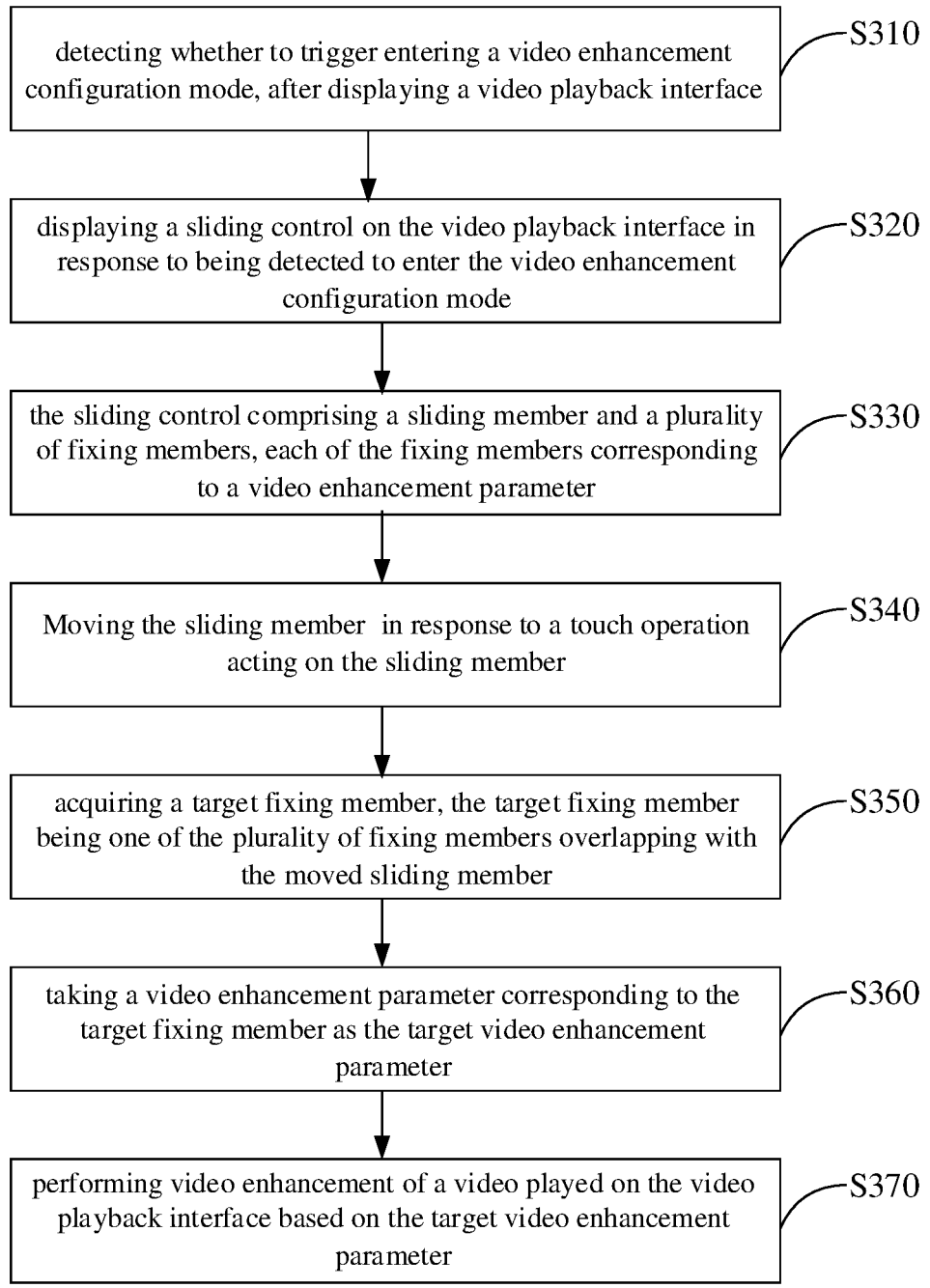
FIG. 15 shows a flowchart of yet another video enhancement control method according to the present disclosure.

With reference to FIG. 15, a video enhancement control method provided by the present disclosure, which is applied to an electronic apparatus, includes operations described in the following blocks.

At block S310: detecting whether to enter a video enhancement configuration mode, in response to displaying a video playback interface;

At block S320: displaying a sliding control on the video playback interface, in response to being detected to enter the video enhancement configuration mode;

At block S330: the sliding control including a sliding member and a plurality of fixing members, each of the fixing members corresponding to a video enhancement parameter.

Figure 16:
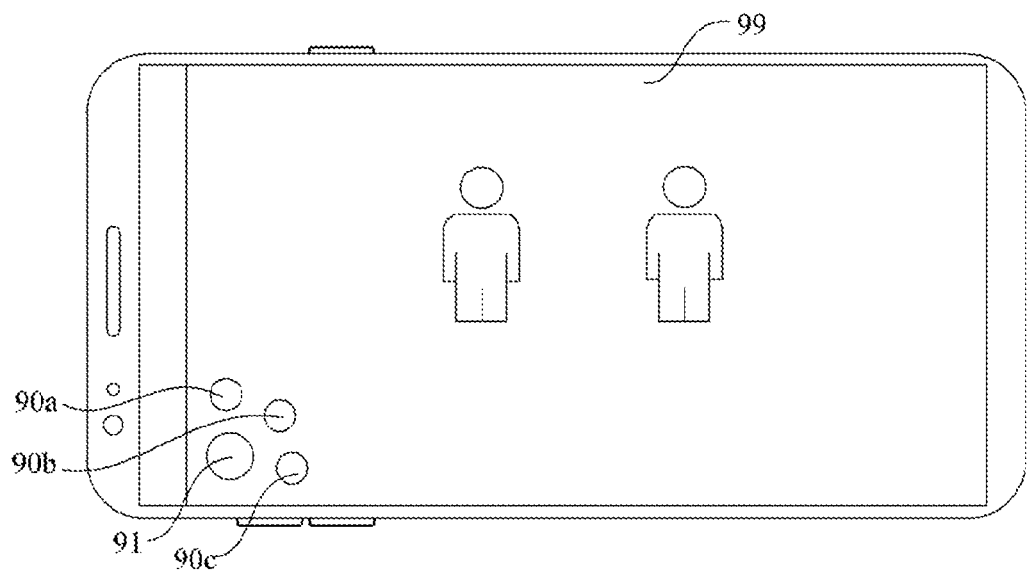
FIG. 16 shows a schematic diagram of a sliding control in still another video enhancement control method according to the present disclosure.

As shown in FIG. 16, the sliding control includes a sliding member 91 and fixing members 90a, 90b, and 90c. The fixing members 90a, 90b, and 90c correspond to their own video enhancement parameters, respectively. Therein, similar to the position identifiers in the foregoing contents, in an embodiment, visual enhancement parameters respectively corresponding to the fixing members 90a, 90b, and 90c represent different combinations of dimensions. In another embodiment, the visual enhancement parameters respectively corresponding to the fixing members 90a, 90b, and 90c represent continuous enhancement of a certain dimension or several dimensions.

At block S340, the sliding member may be moved in response to a touch operation acting on the sliding member.

At block S350, a target fixing member may be acquired, where the target fixing member is one of the plurality of fixing members that overlaps with the sliding member after the movement.

With further reference to FIG. 16, if the sliding member 91 is moved to partially or completely overlap with the fixed member 90b, the electronic apparatus may identify the 90b as the target fixing member.

At block S360, the video enhancement parameter corresponding to the target fixing member may be taken as the target video enhancement parameter.

At block S370, video enhancement of a video played on the video playback interface may be performed based on the target video enhancement parameter.

A video enhancement control method provided by the present disclosure detects whether a video enhancement configuration mode is entered in response to a video playback interface being displayed, displays a sliding control on the video playback interface if the video enhancement configuration mode is entered, and then acquires a target video enhancement parameter in response to a sliding operation acting on the sliding control, followed by performing visual enhancement of a video played on the video playback interface based on the target video enhancement parameter. As such, the user may adjust a visual enhancement effect of the currently played video based on displaying of the sliding component displayed on the video playback interface, thereby improving the user's experience.

Figure 17:
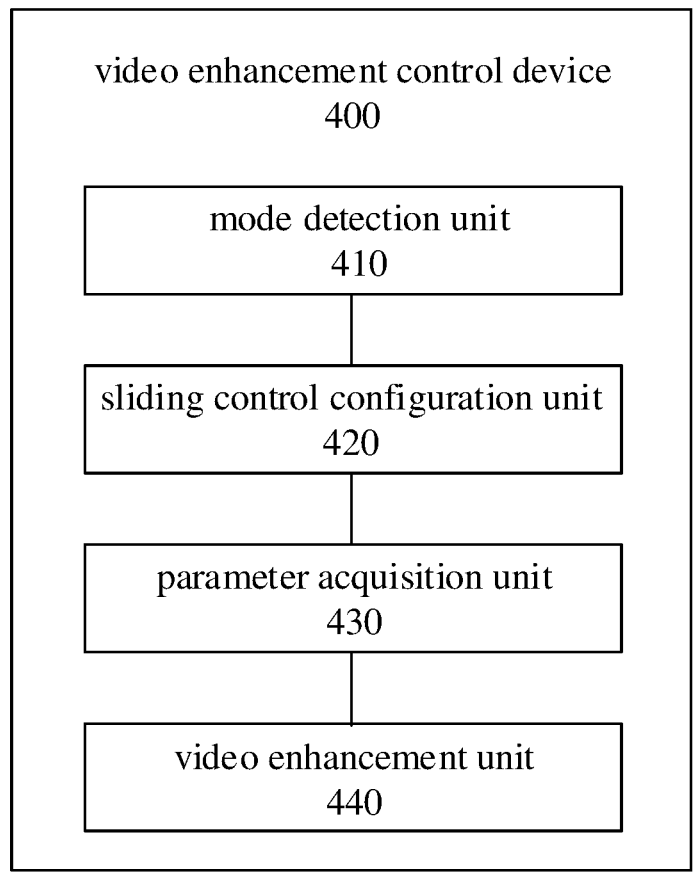
FIG. 17 shows a structural block diagram of a video enhancement control device according to the present disclosure.

With reference to FIG. 17, a video enhancement control device 400 provided by the present disclosure, running on an electronic apparatus, includes a mode detection unit 410, a sliding control configuration unit 420, a parameter acquisition unit 430 and a video enhancement unit 440.

The mode detection unit 410 is configured to detect whether to enter a video enhancement configuration mode in response to displaying a video playback interface.

The sliding control configuration unit 420 is configured to display a sliding control on the video playback interface in response to being detected to enter the video enhancement configuration mode.

The parameter acquisition unit 430 is configured to acquire a target video enhancement parameter in response to a sliding operation acting on the sliding control.

The video enhancement unit 440 is configured to perform video enhancement of a video played on the video playback interface based on the target video enhancement parameter.

Figure 18:
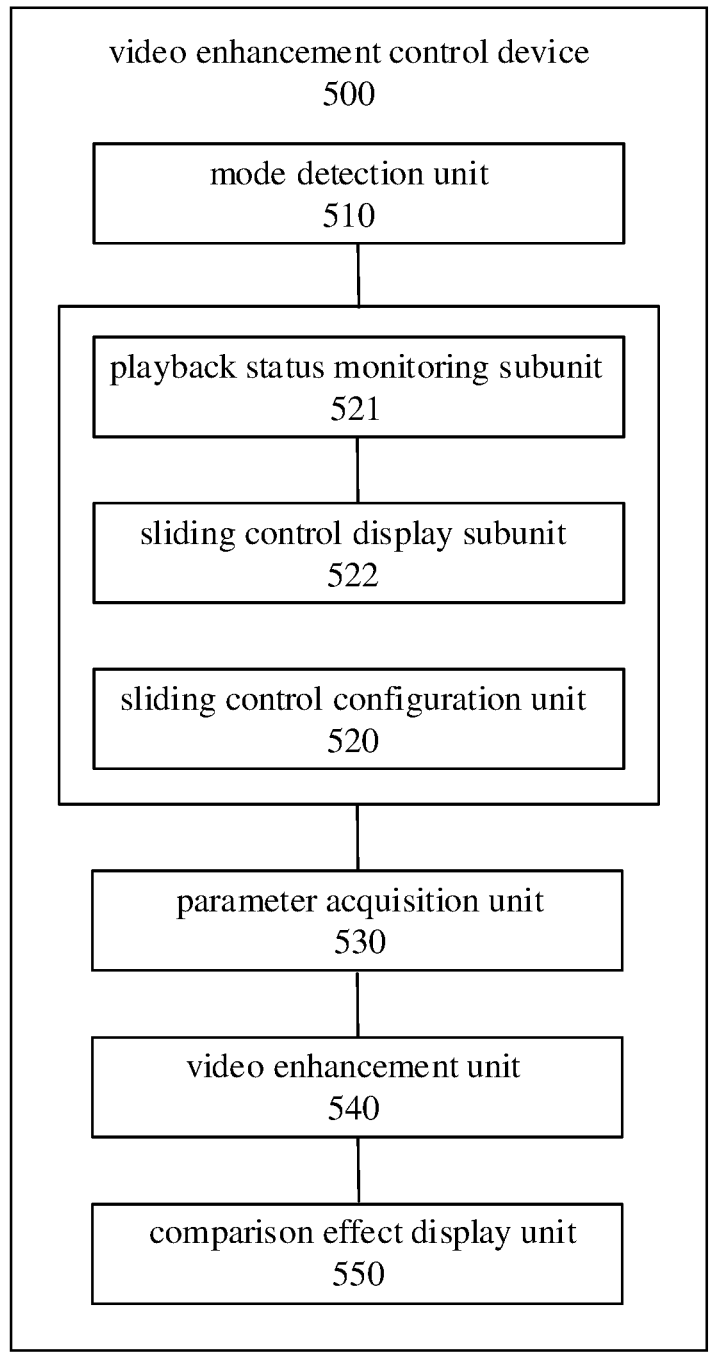
FIG. 18 shows a structural block diagram of another video enhancement control device according to the present disclosure.

With reference to FIG. 18, a video enhancement control device 500 provided by the present disclosure, running on an electronic apparatus, includes: a mode detection unit 510, a sliding control configuration unit 520, a parameter acquisition unit 530, a video enhancement unit 540, and a comparison effect display unit 550.

The mode detection unit 510 is configured to detect whether to enter a video enhancement configuration mode in response to displaying a video playback interface.

The sliding control configuration unit 520 is configured to display a sliding control on the video playback interface in response to being detected to enter the video enhancement configuration mode.

The sliding control includes a sliding component and a plurality of position identifiers, and each of the position identifiers corresponds to a different video enhancement parameter.

In an embodiment, the sliding control configuration unit 520 includes: a playback status monitoring subunit 521, configured to detect a playback status of the currently played video; and a sliding control display subunit 522, configured to sequentially display a plurality of position identifiers whose number is N along a parallel direction of a longer side of the video playback interface if the playback status is "pause", where a distance between the N position identifiers is a first spacing.

The sliding control display subunit 522 is further configured to sequentially display a plurality of position identifiers whose number is M along a parallel direction of a shorter side of the video playback interface if the playback status is "playing", where a distance between the M position identifiers is a second spacing. Therein, the first spacing is smaller than the second spacing; the N is greater than the M; and a difference between video enhancement parameters corresponding to adjacent position identifiers is directly proportional to a value of a distance between the adjacent position identifiers.

The parameter acquisition unit 530 is configured to take a video enhancement parameter corresponding to a position identifier at an ending position of the sliding operation, as a target video enhancement parameter.

In an embodiment, the sliding component includes a sliding bar and a sliding block slidable on the sliding bar, where the plurality of position identifiers are sequentially arranged on the sliding bar. The parameter acquisition unit 530 is specifically configured to move the sliding block on the sliding bar in response to a sliding operation acting on the sliding block, to acquire a video enhancement parameter corresponding to a position identifier where the moved sliding block is located, and to take a video enhancement parameter corresponding to the moved position, as a target video enhancement parameter.

The video enhancement unit 540 is configured to perform video enhancement of the video played on the video playback interface based on the target video enhancement parameter.

In an embodiment, the device 500 further includes: a comparison effect display unit 550, configured to acquire video enhancement parameters corresponding to position identifiers passed by the sliding operation and to display in a suspending manner, on the video playback interface, wherein the video images are enhanced based on the video enhancement parameters corresponding to the passed position identifiers.

In another embodiment of determining the target video enhancement parameter, the parameter acquisition unit 530 is further configured to take a video image for which a touch operation is detected in the video images displayed in the suspending manner as a target video image, and to take a video enhancement parameter corresponding to the target video image as the target video enhancement parameter.

Figure 19:
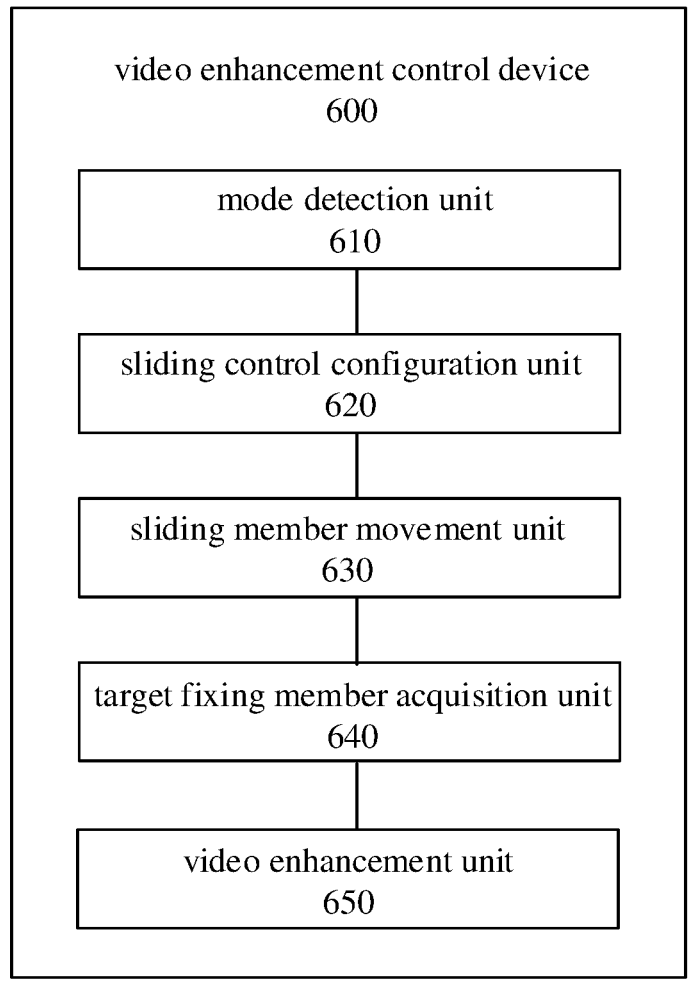
FIG. 19 shows a structural block diagram of still another video enhancement control device according to the present disclosure.

With reference to FIG. 19, a video enhancement control device 600 provided by the present disclosure, running on an electronic apparatus, includes: a mode detection unit 610, a sliding control configuration unit 620, a sliding member movement unit 630, and a target fixing member acquisition unit 640 and a video enhancement unit 650.

The mode detection unit 610 is configured to detect whether to enter a video enhancement configuration mode in response to displaying a video playback interface.

The sliding control configuration unit 620 is configured to display a sliding control on the video playback interface in response to being detected to enter the video enhancement configuration mode.

The sliding control includes a sliding member and a plurality of fixing members, where each of the fixing members corresponds to a video enhancement parameter.

The sliding member movement unit 630 is configured to move the sliding member in response to a control operation acting on the sliding member.

The target fixing member acquisition unit 640 is configured to acquire a target fixing member which is one of the plurality of fixing members overlapping with the moved sliding member.

The video enhancement unit 650 is configured to perform video enhancement of a video played on the video playback interface based on the target video enhancement parameter.

It should be noted that, those skilled in the art may clearly understand that, for the convenience and conciseness of the description, corresponding procedures in the foregoing method embodiments may be referred to for specific working procedures of the device and units described above, and details are omitted herein. In several embodiments provided by the present disclosure, coupling between modules may be coupling in electrical, mechanical or other forms. In addition, respective functional modules in respective embodiments of the present disclosure may be integrated into one processing module, or each module may exist alone physically, or two or more modules may be integrated into one module. The above-mentioned integrated module can be implemented in the form of hardware or a software functional module.

It should be noted that, in the present disclosure, how to encode audio data according to audio encoding types can adopt the existing technology, which will not be detailed in the present disclosure.

In summary, a video enhancement control method and device, an electronic apparatus and a storage medium provided by the present disclosure detect whether a video enhancement configuration mode is entered in response to a video playback interface being displayed, and in response to the video enhancement configuration mode being entered in response to a video playback interface being displayed, displays a sliding control on the video playback interface, and then acquires a target video enhancement parameter in response to a sliding operation on the sliding control, followed by performing video enhancement of a video played on the video playback interface based on the target video enhancement parameter. As a result, while performing video enhancement of the played video to achieve an ultra-clear visual effect, the user can adjust a video enhancement effect of the currently played video based on displaying of the sliding component displayed on the display video playback interface, thereby improving the user's experience.

An electronic apparatus provided by the present disclosure will be described below in conjunction with FIG. 20. The electronic apparatus can be a smart phone, a tablet computer, or a portable computer.

Figures 20, 21:
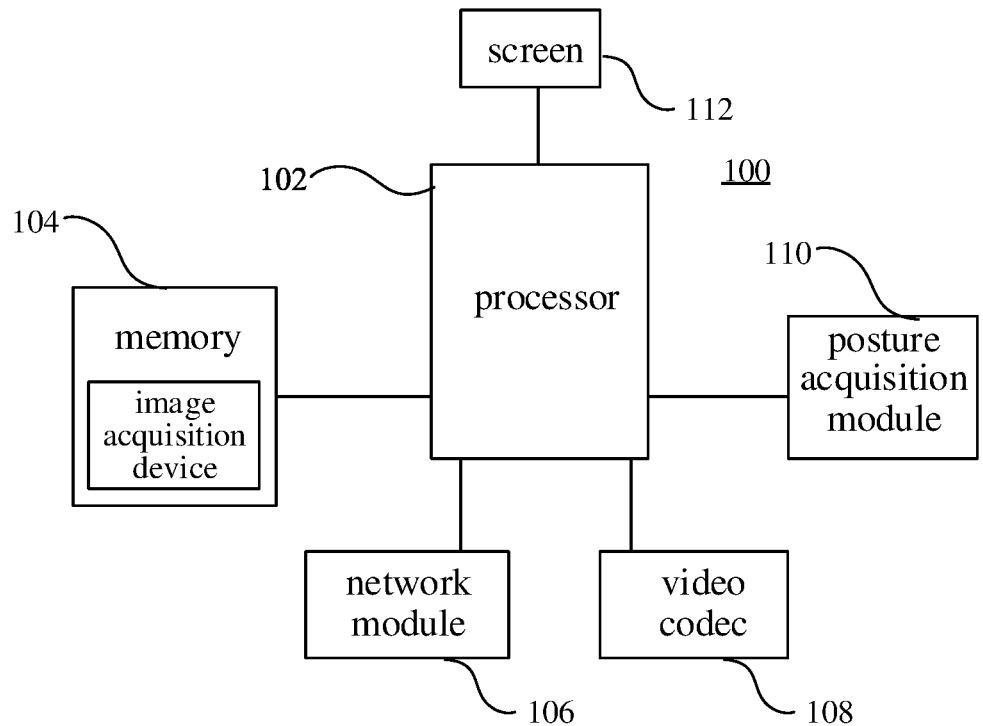
FIG. 20 shows a structural block diagram of an electronic apparatus of the present disclosure for implementing a video enhancement control method according to an embodiment of the present disclosure.
FIG. 21 shows a storage unit for storing or carrying program codes for implementing an image processing method according to an embodiment of the present disclosure.

With reference to FIG. 20, based on the foregoing video enhancement control method and device, an embodiment of the present disclosure further provides another electronic apparatus 100 capable of executing the foregoing video enhancement control method. The electronic apparatus 100 includes one or more (only one shown in the Figure) processors 102, a memory 104, a network module 106, a video codec 108, a posture acquisition module 110, and a screen 112 coupled to each other. Therein, the memory 104 has stored thereon a program capable of executing the contents in the foregoing embodiments, and the processor(s) 102 can execute the program stored in the memory 104.

The processor 102 may include one or more processing cores. The processor 102 uses various interfaces and lines to connect various parts of the entire electronic apparatus 100, and executes various functions and processing data of the electronic apparatus 100 by running or executing an instruction, a program, a set of codes, or a set of instructions stored in the memory 104, and calling up data stored in the memory 104. Optionally, the processor 102 may be implemented in at least hardware form of Digital Signal Processing (DSP), Field-Programmable Gate Array (FPGA), and Programmable Logic Array (PLA). The processor 102 may be integrated with one of a central processing unit (Central Processing Unit, CPU), a graphics processing unit (Graphics Processing Unit, GPU), and a modem, or a combination thereof. Therein, the CPU mainly processes an operating system, a user interface, an application and the like; the GPU is responsible for rendering and drawing of the displayed contents; and the modem is configured to process wireless communication. It may be understood that, the above-mentioned modem may not be integrated into the processor 102, but may be implemented by a communication chip alone.

The memory 104 may include a random access memory (Random Access Memory, RAM), or may include a read-only memory (Read-Only Memory). The memory 104 may be configured to store an instruction, a program, a code, a set of codes or a set of instructions. The memory 104 may include a program storage area and a data storage area. For example, the memory 104 may store an image capturing device. The image acquisition device may be the aforementioned device 400, device 500, or device 600. Therein, the program storage area may store an instruction for implementing the operating system, an instruction for implementing at least one function (such as a touch function, a sound playback function, an image playback function, etc.), an instruction for implementing the following method embodiments, and the like. The data storage area may also store data (such as a phone book, audio and video data, chat record data), and the like created by the electronic apparatus 100 during use.

The network module 106 is configured to receive and send electromagnetic waves, and to realize mutual conversion between the electromagnetic waves and electrical signals, so as to communicate with a communication network or other equipment, such as communication with a wireless access point. The network module 106 may include various existing circuit elements for performing these functions, such as, an antenna, a radio frequency transceiver, a digital signal processor, an encryption/decryption chip, a subscriber identity module (SIM) card, a memory, and the like. The network module 106 may communicate with various networks such as the Internet, an enterprise's Intranet, and a wireless network, or communicate with other equipment through a wireless network. The aforementioned wireless network may include a cellular telephone network, a wireless local area network, or a metropolitan area network.

The video codec 108 may be configured to decode data requested by the network module 106 from the network, for being transmitted to the screen 112 for display. Specifically, the video codec 108 can be a GPU, a dedicated DSP, FPGA, ASIC chip, or the like.

The posture acquisition module 110 may be configured to collect postures of the electronic apparatus. The posture acquisition module 110 includes a gyroscope, an acceleration sensor and the like.

Reference is made to FIG. 21, which shows a structural block diagram of a computer-readable storage medium according to an embodiment of the present disclosure. The computer-readable medium 800 has stored thereon program codes which may be called up by a processor to implement the method described in the foregoing method embodiments.

The computer-readable storage medium 800 may be an electronic memory such as a flash memory, EEPROM (Electrically Erasable Programmable Read Only Memory), EPROM, a hard disk, or ROM. Optionally, the computer-readable storage medium 800 includes a non-transitory computer-readable storage medium. The computer-readable storage medium 800 has storage space for executing program codes 810 of any method step in the above-mentioned method. These program codes can be read from or written into one or more computer program products. The program codes 810 may be compressed in an appropriate form, for example.

Finally, it should be noted that, the foregoing embodiments are used simply to illustrate the technical solutions of the present disclosure, rather than limit them. Although the present disclosure has been described in detail with reference to the foregoing embodiments, those of ordinary skill in the art should understand that: it is still allowed to make modifications to the technical solutions recited in the respective embodiments described above, or to make equivalent replacements of part of the technical features thereof. These modifications or replacements do not drive essence of the corresponding technical solutions to deviate from the spirit and scope of the technical solutions of the respective embodiments of the present disclosure.

What is claimed is:

1. A method of video enhancement control, for an electronic apparatus, the method comprising:
   detecting whether to enter a video enhancement configuration mode in response to displaying a video playback interface;
   displaying a sliding control on the video playback interface in response to entering the video enhancement configuration mode, wherein the sliding control comprises a sliding component and a plurality of position identifiers, each of the plurality of position identifiers corresponds to a respective different video enhancement parameter, wherein each respective different video enhancement parameter comprises a respective combination of multiple dimensions, wherein the multiple dimensions are selected from a definition dimension, a denoising degree dimension, a saturation dimension, and a contrast dimension;
   acquiring a target video enhancement parameter in response to a sliding operation acting on the sliding control, comprising:
      taking a first video enhancement parameter as the target video enhancement parameter, wherein the first video enhancement parameter corresponds to a position identifier at an ending position of the sliding operation in response to the sliding operation acting on the sliding component;
   performing a video enhancement of a video played on the video playback interface based on the target video enhancement parameter;
   acquiring a second video enhancement parameter, wherein the second video enhancement parameter corresponds to position identifiers of the plurality of position identifiers passed by the sliding operation; and
   displaying video images in a suspending manner on the video playback interface, wherein the video images are enhanced based on second video enhancement parameters according to the position identifiers of the plurality of position identifiers passed by the sliding operation,
   wherein when displaying video images in a suspending manner on the video playback interface, a video that is not enhanced is played in the video playback interface, and at the same time, the video images enhanced based on the second video enhancement parameters are played in a suspending manner above the video that is not enhanced.

2. The method according to claim 1, wherein the method further comprises:
taking a video image among the video images displayed in the suspending manner as a target video image, wherein a touch operation is detected in the target video image; and
taking a video enhancement parameter corresponding to the target video image as the target video enhancement parameter.

3. The method according to claim 2, wherein the sliding component comprises a sliding bar and a sliding block slidable on the sliding bar, the plurality of position identifiers are sequentially arranged on the sliding bar; and wherein the taking, a first video enhancement parameter as the target video enhancement parameter, wherein the first video enhancement parameter corresponds to the position identifier at the ending position of the sliding operation in response to the sliding operation acting on the sliding component comprises:
moving the sliding block on the sliding bar in response to the sliding operation acting on the sliding block;
acquiring a third video enhancement parameter, wherein the third video enhancement parameter corresponds to a position identifier where the sliding block being moved to; and
taking the third video enhancement parameter as the target video enhancement parameter.

4. The method according to claim 1, wherein the position identifiers are configured to represent different gears of the sliding operation, the different gears corresponding to different video enhancement parameters, and wherein the taking the first video enhancement parameter as the target video enhancement parameter, wherein the first video enhancement parameter corresponds to the position identifier at the ending position of the sliding operation in response to the sliding operation acting on the sliding component comprises:
taking the first video enhancement parameter as the target video enhancement parameter, wherein the first video enhancement parameter corresponds to a gear where the ending position of the sliding operation lies in response to the sliding operation acting on the sliding component.

5. The method according to claim 1, wherein the displaying the sliding control on the video playback interface in response to being detected to enter the video enhancement configuration mode comprises:
detecting a playback status of currently played video in response to entering the video enhancement configuration mode;
determining a displaying manner of the sliding component and the position identifiers according to the playback status of the currently played video; and
displaying a plurality of position identifiers along a parallel direction of a longer side of the video playback interface in response to the playback status being "pause" and displaying a plurality of the position identifiers along a parallel direction of a shorter side of the video playback interface in response to the playback status being "playing".

6. The method according to claim 1, wherein the displaying the sliding control on the video playback interface in response to being detected to enter the video enhancement configuration mode comprises:
acquiring a playback status of currently played video in response to entering the video enhancement configuration mode;
taking a parallel direction of a longer side displayed in a landscape mode as a parallel direction of the longer side of the video playback interface in response to a display mode being the landscape mode; and
taking a parallel direction of a shorter side displayed in a portrait mode as the parallel direction of the longer side of the video playback interface in response to the display mode being the portrait mode.

7. The method according to claim 5, wherein the displaying the plurality of position identifiers along the parallel direction of the longer side of the video playback interface in response to the playback status being "pause" and displaying the plurality of position identifiers along the parallel direction of the shorter side of the video playback interface in response to the playback status being "playing" comprises:
displaying N position identifiers along the parallel direction of the longer side of the video playback interface in response to the playback status being "pause", wherein distance between the N position identifiers is a first spacing; and
displaying M position identifiers along the parallel direction of the shorter side of the video playback interface in response to the playback status being "playing", wherein a distance between the M position identifiers is a second spacing, the first spacing being smaller than the second spacing, a value of the N position identifiers being greater than a value of the M position identifiers, a difference between video enhancement parameters corresponding to adjacent position identifiers being directly proportional to a value of a distance between the adjacent position identifiers.

8. The method according to claim 1, wherein the sliding control comprises a sliding member and a plurality of fixing members, each of the plurality of fixing members corresponding to a video enhancement parameter, and wherein the acquiring the target video enhancement parameter in response to the sliding operation acting on the sliding control comprises:
moving the sliding member in response to a touch operation acting on the sliding member;
acquiring a target fixing member, the target fixing member being a fixing member of the plurality of fixing members overlapping with the moved sliding member; and
taking a video enhancement parameter corresponding to the target fixing member as the target video enhancement parameter.

9. The method according to claim 1, wherein a controlling control is displayed in the video playback interface, and wherein the detecting whether to enter the video enhancement configuration mode in response to displaying the video playback interface comprises:
detecting whether the controlling control is in an on state in response to displaying the video playback interface; and
determining to enter the video enhancement configuration mode in response to detecting that the controlling control is in the on state.

10. The method according to claim 9, wherein the method further comprises:
monitoring a picture quality of a currently played video in real time in response to detecting displaying of the video playback interface; and displaying prompt information of entering the video enhancement configuration mode in response to detecting that the picture quality does not meet preset conditions, and the prompt information is configured to enable the video enhancement in the video enhancement configuration mode.

11. The method according to claim 10, wherein the preset conditions comprise at least one of the following conditions: a resolution of a played video is higher than a set resolution, and a number of noises in the played video is less than a preset number, and a color saturation of the played video is higher than a set saturation value.

12. The method according to claim 1, further comprising prior to the detecting whether to enter the video enhancement configuration mode in response to displaying the video playback interface:
  detecting whether there is currently a set video playback application running; and
  determining to display the video playback interface in response to the set video playback application running.

13. An electronic apparatus, comprising:
  one or more processors, a video codec and a memory; and
  one or more programs, wherein the one or more programs are stored in the memory; the one or more processors are configured to execute the one or more programs to implement following operations:
    detecting whether to enter a video enhancement configuration mode in response to displaying a video playback interface;
    displaying a sliding control on the video playback interface in response to entering the video enhancement configuration mode, wherein the sliding control comprises a sliding component and a plurality of position identifiers, each of the plurality of position identifiers corresponds to a respective different video enhancement parameter wherein each respective different video enhancement parameter comprises a respective combination of multiple dimensions, wherein the multiple dimensions are selected from a definition dimension, a denoising degree dimension, a saturation dimension, and a contrast dimension;
    acquiring a target video enhancement parameter in response to a sliding operation acting on the sliding control, comprising:
      taking a first video enhancement parameter as the target video enhancement parameter, wherein the first video enhancement parameter corresponds to a position identifier of the plurality of position identifiers at an ending position of the sliding operation in response to the sliding operation acting on the sliding component;
    performing a video enhancement of a video played on the video playback interface based on the target video enhancement parameter;
    acquiring a second video enhancement parameter, wherein the second video enhancement parameter corresponds to position identifiers of the plurality of position identifiers passed by the sliding operation; and
    displaying video images in a suspending manner on the video playback interface, wherein the video images are enhanced based on second video enhancement parameters according to the position identifiers of the plurality of position identifiers passed by the sliding operation,
  wherein when displaying video images in a suspending manner on the video playback interface, a video that is not enhanced is played in the video playback interface, and at the same time, the video images enhanced based on the second video enhancement parameters are played in a suspending manner above the video that is not enhanced.

14. The electronic apparatus according to claim 13, wherein the one or more processors are further configured to execute the one or more programs to implement following operations:
  detecting a playback status of currently played video in response to being detected to enter the video enhancement configuration mode;
  determining a displaying manner of the sliding component and the position identifiers according to the playback status of the currently played video; and
  displaying a plurality of position identifiers along a parallel direction of a longer side of the video playback interface in response to the playback status being "pause" and displaying a plurality of the position identifiers along a parallel direction of a shorter side of the video playback interface in response to the playback status being "playing".

15. The electronic apparatus according to claim 14, wherein the one or more processors are further configured to execute the one or more programs to implement following operations:
  displaying N position identifiers along the parallel direction of the longer side of the video playback interface in response to the playback status being "pause", wherein a distance between the N position identifiers is a first spacing; and
  displaying M position identifiers along the parallel direction of the shorter side of the video playback interface in response to the playback status being "playing", wherein a distance between the M position identifiers is a second spacing, the first spacing being smaller than the second spacing, a value of the N position identifiers being greater than a value of the M position identifiers, a difference between video enhancement parameters corresponding to adjacent position identifiers being directly proportional to a value of a distance between the adjacent position identifiers.

16. A non-transitory computer-readable storage medium configured to store programs, wherein the programs, when executed by a processor, implement following operations:
  detecting whether to enter a video enhancement configuration mode in response to displaying a video playback interface;
  displaying a sliding control on the video playback interface in response to entering the video enhancement configuration mode, wherein the sliding control comprises a sliding component and a plurality of position identifiers, each of the plurality of position identifiers corresponds to a respective different video enhancement parameter, wherein each respective different video enhancement parameter comprises a respective combination of multiple dimensions, wherein the multiple dimensions are selected from a definition dimension, a denoising degree dimension, a saturation dimension, and a contrast dimension;
  acquiring a target video enhancement parameter in response to a sliding operation acting on the sliding control, comprising:
    taking a first video enhancement parameter as the target video enhancement parameter, wherein the first video enhancement parameter corresponds to a position identifier of the plurality of position identifiers at an ending position of the sliding operation in response to the sliding operation acting on the sliding component;

performing a video enhancement of a video played on the video playback interface based on the target video enhancement parameter;

acquiring a second video enhancement parameter, wherein the second video enhancement parameter corresponds to position identifiers of the plurality of position identifiers passed by the sliding operation; and displaying video images in a suspending manner on the video playback interface, wherein the video images are enhanced based on second video enhancement parameters according to the position identifiers of the plurality of position identifiers passed by the sliding operation, wherein when displaying video images in a suspending manner on the video playback interface, a video that is not enhanced is played in the video playback interface, and at the same time, the video images enhanced based on the second video enhancement parameters are played in a suspending manner above the video that is not enhanced.

\* \* \* \* \*